(12) United States Patent
Tsuruta et al.

(10) Patent No.: US 10,720,621 B2
(45) Date of Patent: Jul. 21, 2020

(54) BATTERY MODULE

(71) Applicant: GS Yuasa International Ltd., Kyoto-shi (JP)

(72) Inventors: Shogo Tsuruta, Kyoto (JP); Masamitsu Tononishi, Kyoto (JP); Ryutaro Nishikawa, Kyoto (JP)

(73) Assignee: GS YUASA INTERNATIONAL LTD., Kyoto-Shi, Kyoto (JP)

( * ) Notice: Subject to any disclaimer, the term of this patent is extended or adjusted under 35 U.S.C. 154(b) by 116 days.

(21) Appl. No.: 14/244,823

(22) Filed: Apr. 3, 2014

(65) Prior Publication Data
US 2014/0302357 A1    Oct. 9, 2014

(30) Foreign Application Priority Data

Apr. 8, 2013  (JP) .................................. 2013-080627
Mar. 7, 2014  (JP) .................................. 2014-045648

(51) Int. Cl.
| H01M 2/00 | (2006.01) |
| H01M 2/12 | (2006.01) |
| H01M 2/10 | (2006.01) |
| H01M 2/14 | (2006.01) |
| H01M 10/48 | (2006.01) |

(52) U.S. Cl.
CPC ....... *H01M 2/1223* (2013.01); *H01M 2/1077* (2013.01); *H01M 2/1229* (2013.01); *H01M 2/14* (2013.01); *H01M 10/482* (2013.01)

(58) Field of Classification Search
CPC ............. H01M 2/1223; H01M 2/1211; H01M 10/482; H01M 10/425; H01M 10/457; H01M 2/1016; H01M 2/1077
See application file for complete search history.

(56) References Cited

U.S. PATENT DOCUMENTS

2012/0068668 A1*  3/2012  Kittell .................. B60L 11/185
                                                        320/162
2012/0080939 A1*  4/2012  Shimowake ............. H01R 9/24
                                                        307/11
(Continued)

FOREIGN PATENT DOCUMENTS

JP  2000-067825 A  3/2000
JP  2005-251577 A  9/2005
(Continued)

OTHER PUBLICATIONS

Kume, machine translation of JP 2012/014963 A (Year: 2012).*
(Continued)

*Primary Examiner* — Nicholas P D'Aniello
(74) *Attorney, Agent, or Firm* — McGinn I.P. Law Group, PLLC

(57) ABSTRACT

A battery module has a cell unit including battery cells and a battery monitoring element attached to the cell unit. The battery cells are arranged in a first direction. The battery cell includes pressure release section for releasing a pressure in the battery cell. The cell unit has side surfaces including at least one internal pressure release section surface which is a surface where the internal pressure release section is disposed. The battery monitoring element is disposed on a non internal pressure release section surface which is different from the internal pressure release section surface.

15 Claims, 7 Drawing Sheets

(56) References Cited

U.S. PATENT DOCUMENTS

| | | | | |
|---|---|---|---|---|
| 2012/0129024 A1* | 5/2012 | Marchio | ............ | H01M 2/1252 429/87 |
| 2012/0244400 A1* | 9/2012 | Youngs | .................... | B60K 6/48 429/82 |
| 2012/0301749 A1* | 11/2012 | Okano | ................. | H01M 2/202 429/7 |
| 2013/0130071 A1* | 5/2013 | Adachi | .............. | H01M 10/482 429/53 |
| 2013/0149571 A1* | 6/2013 | Lee | .................... | B60L 11/1879 429/61 |
| 2013/0183543 A1* | 7/2013 | Yoshioka | ............ | H01M 2/1077 429/7 |
| 2013/0244069 A1* | 9/2013 | Horii | .................. | H01M 2/1072 429/90 |

FOREIGN PATENT DOCUMENTS

| | | | |
|---|---|---|---|
| JP | 2006-196277 | A | 7/2006 |
| JP | 2008-226744 | A | 9/2008 |
| JP | 2009-266563 | A | 11/2009 |
| JP | 2011-103259 | A | 5/2011 |
| JP | 2012-009389 | A | 1/2012 |
| JP | 2012-014963 | A | 1/2012 |
| JP | 2012-015121 | A | 1/2012 |
| JP | 2012-079510 | A | 4/2012 |
| JP | 5133330 | B2 | 1/2013 |

OTHER PUBLICATIONS

Shinichi Tobishima, "Method for Designing Latium-Ion Batteries for Next Generation Automobiles", and English translation of summary, Jan. 25, 2013, Science Information Publication Inc.., ISBN 978-4-904774-01-4 C2054.

* cited by examiner

BATTERY MODULE

CROSS-REFERENCE TO RELATED APPLICATIONS

This application claims priorities of Japanese Patent Application Nos. 2013-080267 filed on Apr. 8, 2013 and 2014-045648 filed on Mar. 7, 2014, the contents of which are incorporated herein by reference.

FIELD

The present invention relates to a battery module.

BACKGROUND

A conventional battery module is disclosed in JP 5133330 B1. The battery module includes a cell unit including a plurality of battery cells arranged in a first direction and a battery monitoring element that controls a charge amount of the battery cell. The battery monitoring element is mounted on a binding band that binds the cell unit.

In the above conventional battery module, the cell unit has a side surface where a safety valve of each battery call is disposed (hereinafter, referred to as a safety valve surface). In case that the battery monitoring element is disposed over the safety valve surface, the battery monitoring element faces the safety valves.

Accordingly, the battery monitoring element disposed so as to cover the safety valves causes difficulty in exhaust from the safety valves. Further, the battery monitoring element is heated due to heat of exhaust from the safety valves.

SUMMARY

The following presents a simplified summary of the invention disclosed herein in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

An object of the present invention is to provide a battery module capable of facilitating exhaust from the safety valve and preventing the battery monitoring element from being heated.

One aspect of the present invention provides a battery module comprising, a cell unit including a plurality of battery cells arranged in a first direction, and a battery monitoring element attached to the cell unit. The battery cell includes an internal pressure release section configured to release a pressure in the battery cell. The cell unit has, in a peripheral direction thereof with respect to the first direction, a plurality of side surfaces including at least one internal pressure release section surface which is a surface where the internal pressure release section of each battery cell is disposed. The battery monitoring element is disposed on a non internal pressure release section surface included in the plurality of side surfaces of the cell unit, the non internal pressure release section surface being different from the internal pressure release section surface.

BRIEF DESCRIPTION OF DRAWINGS

The foregoing and the other features of the present invention will become apparent from the following description and drawings of an illustrative embodiment of the invention in which.

DESCRIPTION OF EMBODIMENTS

Figure 1:
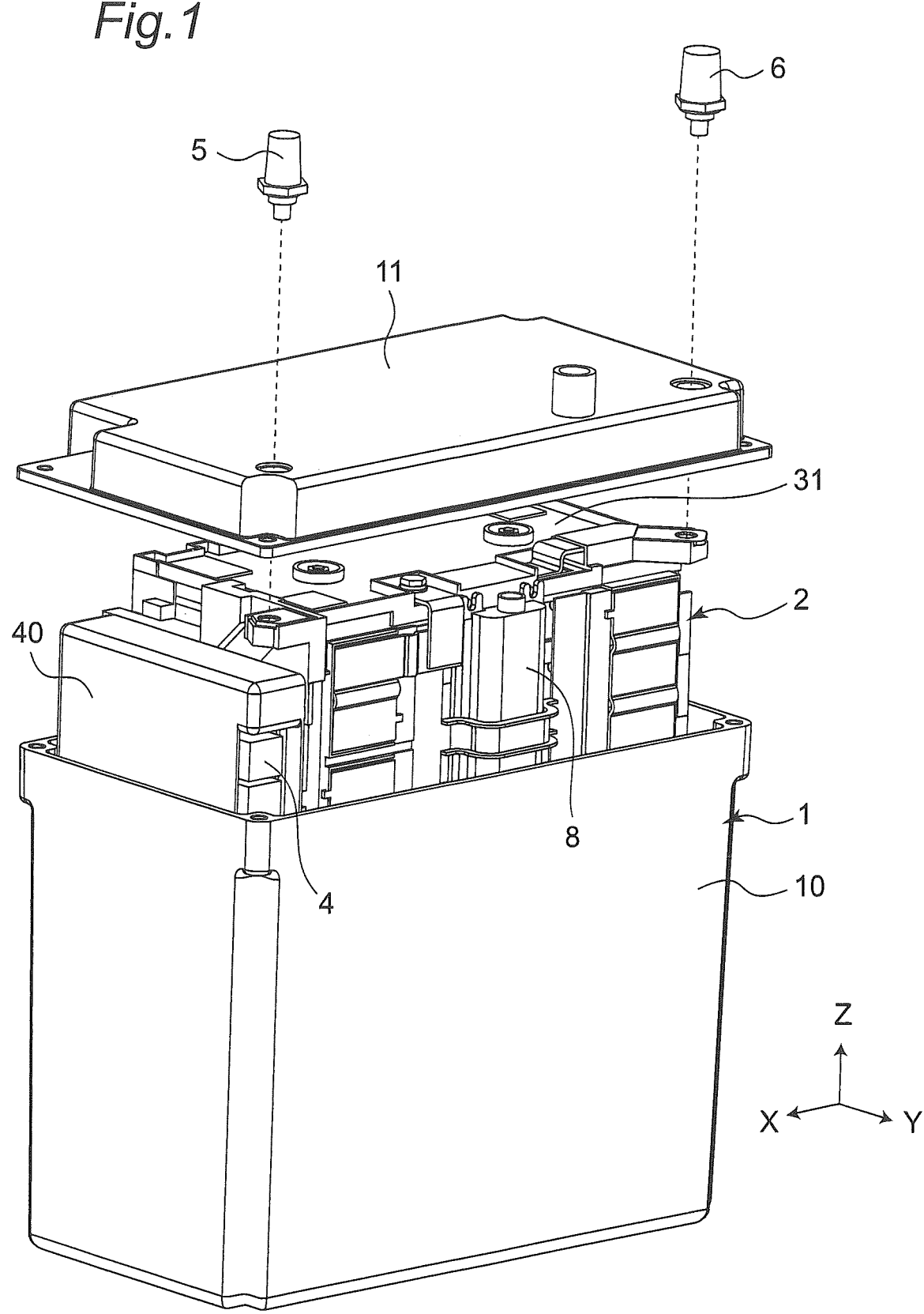
FIG. 1 is a perspective view of a battery module according to a first embodiment of the present invention.

One aspect of the present invention provides a battery module comprising, a cell unit including a plurality of battery cells arranged in a first direction, and a battery monitoring element attached to the cell unit. The battery cell includes an internal pressure release section configured to release a pressure in the battery cell. The cell unit has, in a peripheral direction thereof with respect to the first direction, a plurality of side surfaces including at least one internal pressure release section surface which is a surface where the internal pressure release section of each battery cell is disposed. The battery monitoring element is disposed on a non internal pressure release section surface included in the plurality of side surfaces of the cell unit, the non internal pressure release section surface being different from the internal pressure release section surface.

The battery monitoring element includes e.g. a connector, a control board, and a breaker and monitors the status of the battery cell.

According to the battery module of the present invention, the battery monitoring element is disposed on the second surface of the plurality of side surfaces of cell unit which is different from the first side surface where the safety valve is disposed. Therefore, the battery monitoring element does not face the safe valve. As a result, since the safe valve is not covered by the battery monitoring element, exhaust from the safety valve is facilitated. Further, since the battery monitoring element does not receive heat of exhaust from the safety valve, the battery monitoring element is not heated.

In an embodiment of the batter module, the battery monitoring element abuts against at least a part of the non internal pressure release section surface of the cell unit.

According to the battery module of the embodiment, the battery monitoring element abuts against at least a part of the non internal pressure release section surface of the cell unit. This can eliminate a gap between the battery monitoring element and the second side surface of the cell unit, thus achieving space saving.

In an embodiment of the battery module, the cell unit includes a spacer interposed between the adjacent battery cells. The spacer is formed with a hole. The battery monitoring element includes a projection engaged to the hole.

According to the battery module of the embodiment, since the projection is engaged to the hole of the spacer, expansion of the plurality of the battery cells in the first direction can be prevented.

In an embodiment of the battery module, terminals of each battery cell are disposed on the internal pressure release section surface.

According to the battery module of the embodiment, since the terminals of each battery cell are disposed on the internal pressure release section surface, the battery monitoring element does not face the terminals. As a result, bus bars can be easily connected to the terminals.

In an embodiment, of the battery module, the cell unit includes two end plates respectively disposed at both sides of the plurality of battery cells in the first direction. The battery monitoring element is disposed between the two end plates.

According to the battery module of the embodiment, since the battery monitoring element is disposed between the two end plates, the battery monitoring element can be protected from external impact, etc.

In an embodiment, the battery module comprises a case body with an opening and a lid attached to the case body so as to close the opening of the case body. The cell unit and battery monitoring element are accommodated in the case body so that an end portion of the cell unit in the first direction faces the opening of the case body.

According to the battery module of the embodiment, the cell unit and battery monitoring element are accommodated in the case body so that an end portion of the cell unit in the first direction faces the opening of the case body. This allows the battery monitoring element to abut against the cell unit, thus achieving space saving. On the other hand, in case the battery monitoring element is disposed over the safety valves, it is necessary to provide a gap between the safety valve and the battery monitoring element for smooth exhaust from the safety valves. This disadvantageously, increases a size of the module itself.

In an embodiment of the battery module, the battery monitoring element is positioned at the opening side relative to a height direction center of the case body between its bottom surface and the opening.

According to the battery module of the embodiment, the battery monitoring element is positioned at the opening side relative to a height direction center of the case body between its bottom surface and the opening. Thus, when the case body is installed with the bottom surface down and opening up, even if the safety valve is opened to cause electrolyte in the battery cell to leak inside the case body, the battery monitoring element positioned at the upper part of the case body does not soak in the electrolyte. Further, disposing the battery monitoring element at the opening side of the case body can reduce a distance between the battery monitoring element and a communication connector disposed on the lid.

Further, in an embodiment of the battery module, the battery cell includes a square container and a power generating element contained in the container.

Furthermore, in an embodiment of the battery module, the battery cell includes a bag-like film body and a power generating element contained in the film body.

Furthermore, in an embodiment of the battery module, he battery cell includes a cylindrical container and a power generating element contained in the container.

According to the battery module of the present invention, the battery monitoring element is disposed on the second surface of the plurality of side surfaces of cell unit which is different from the first side surface where the safety valve is disposed. This facilitates exhaust from the safety valve, resulting in that the battery monitoring element is not heated.

Hereinafter, the present invention will be described in detail with reference to an illustrated embodiment.

First Embodiment

FIG. 1 is a perspective view illustrating a battery module according to a first embodiment of the present invention. As illustrated in FIG. 1, the battery module includes a case 1, a cell unit 2 accommodated in the case 1, and a battery monitoring element 4 accommodated in the case 1.

The case 1 includes a case body 10 having an opening and a lid 11 attached to the case body 10 so as to close the opening. The cell unit 2 and battery monitoring element 4 are accommodated in the case body 10 so that an end portion of the cell unit 2 in a first direction (Z-direction) faces the opening of the case body 10.

Arranged outside of the case 1 are a positive electrode external terminal 5 and a negative electrode external terminal 6. The positive electrode terminal 5 and the negative electrode external terminals 6 extend through the lid 11 to be electrically connected to the cell unit 2. The battery monitoring element 4 is attached to the cell unit 2. The battery monitoring element 4 is covered by a cover 40.

Figure 2:
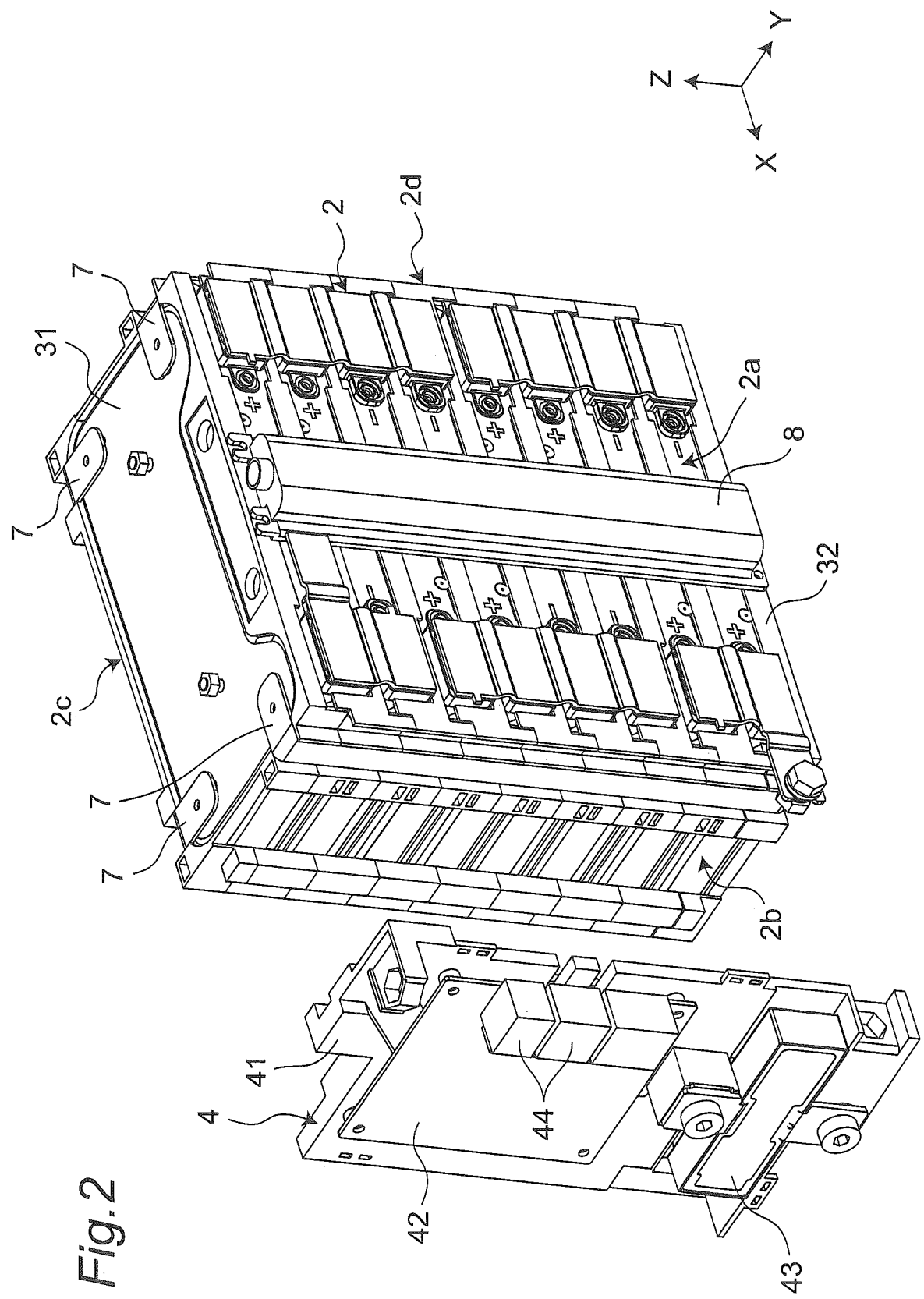
FIG. 2 is an exploded perspective view of a cell unit and a battery monitoring element.
Figure 3:
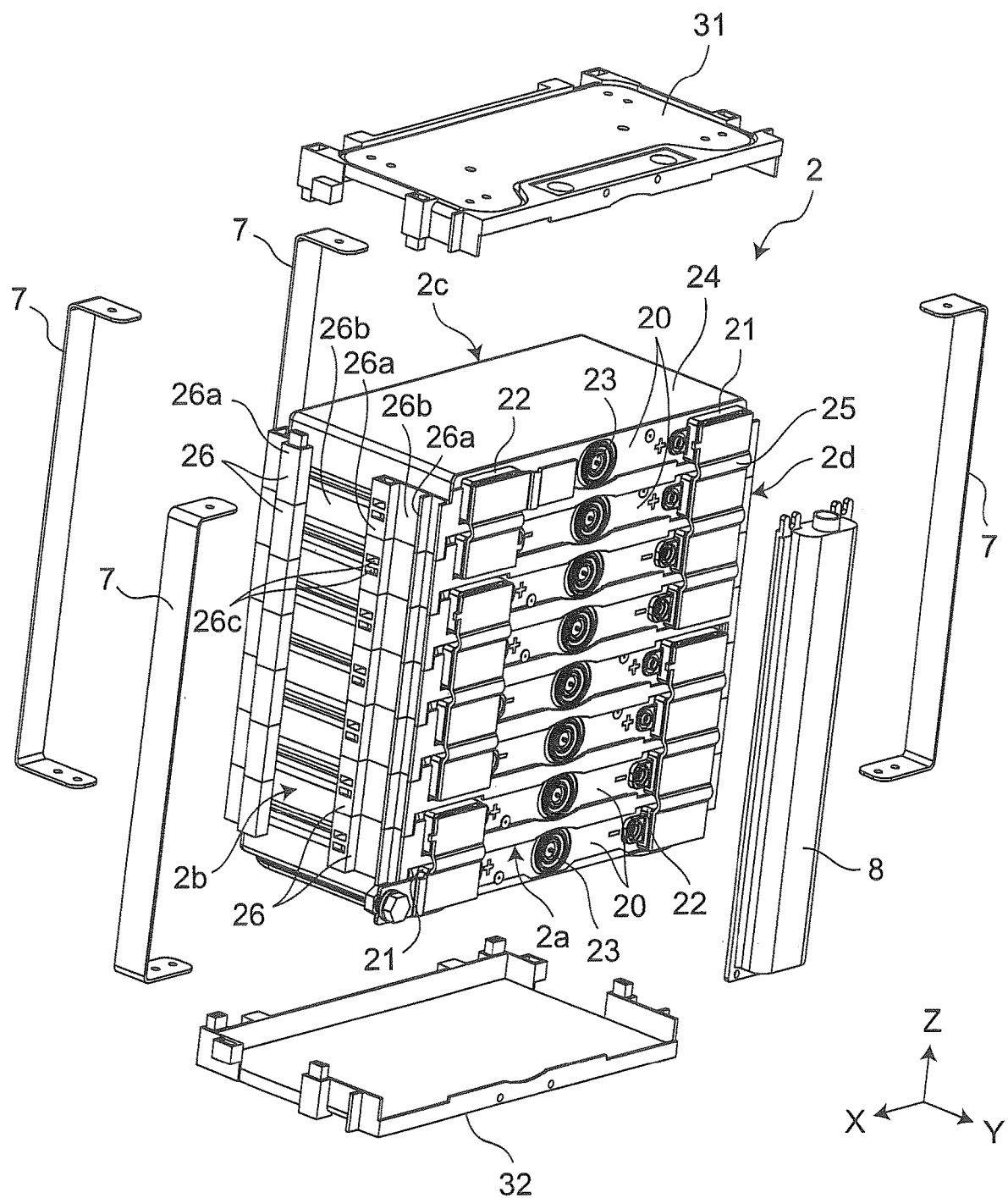
FIG. 3 is an exploded perspective view of the cell unit.

As illustrated in FIGS. 2 and 3, the cell unit 2 has eight battery cells 20 arranged in the first direction (Z-direction). Spacers are respectively interposed between the battery cells 20 adjacent to each other.

The battery cell 20 is each, for example, a non-aqueous electrolyte secondary battery. The battery cell 20 includes a square container 24 and a power generating element accommodated in the square container 24. The power generating element has a positive electrode plate, a negative electrode plate, and separators interposed between the positive and negative electrode plates. A lid of the square container 24 is provided with a positive electrode terminal 21 and a negative electrode terminal 22 respectively being exposed to the outside. The positive electrode terminal 21 and positive electrode plate, as well as negative electrode terminal 22 and negative electrode plate, are electrically connected through a current collector disposed inside the container 24.

The lid of the container 24 is provided with a safety valve 23 arranged at a position between the positive electrode terminal 21 and negative electrode terminal 22. When a pressure of gas generated in the container 24 reaches above a predetermined value, the safety valve 23 releases the gas out of the container 24. The safety valve 23 is an example of an internal pressure release section. The safety valves 23 of the battery cells 20 are covered by an exhaust duct 8 extending in the first direction.

The first to eighth battery cells 20 are arranged in line from one side in the first direction (upper side in the drawing) toward the other side (lower side in the drawing). The first and second battery cells 20 are placed so that the respective positive electrode terminals 21 are aligned on the right side in the drawing. The third and fourth battery cells 20 are placed so that the positive electrode terminals 21 are aligned on the left side in the drawing. The fifth and sixth battery cells 20 are placed so that the respective positive electrode terminals 21 are aligned on the right side in the drawing. Further, the seventh and eighth battery cells 20 are disposed so that the respective positive electrode terminals 21 are aligned on the left side in the drawing.

A pair of the first and second battery cells 20, a pair of the third and fourth battery cells 20, a pair of the fifth and sixth battery cells 20, and a pair of the seventh and eighth battery cells 20 are respectively electrically connected in series via bus bars 25. A positive side of the plurality of batter cells connected in series in that way is electrically connected to the positive electrode external terminal 5 via a bus bar, while a negative side of the serially connected plurality of battery cells 20 is electrically connected to the negative electrode external terminal 6 via a bus bar.

The cell unit 2 has a first end plate 31 and a second end plate 32. The first end plate 31 is arranged on the one side of the plurality of battery cells 20 in the first direction. The second end plate 32 is arranged on the other side of the plurality of battery cells 20 in the first direction. The plurality of battery cells 20 are sandwiched by the first and second end plates 31 and 32.

The cell unit 2 has four side surfaces around its periphery with respect to the first direction. The four side surfaces include a first side surface 2a, a second side surface 2b, a third side surface 2c, and a fourth side surface 2d, which are arranged sequentially in the peripheral direction with respect to the first direction. The first side surface 2a is a surface where the safety valve 23, positive electrode terminal 21, and negative electrode terminal 22 of each battery cell 20 are disposed. The first side surface 2a is an example of an internal pressure release section surface. The second side surface 2b, third side surface 2c, and fourth side surface 2d are examples of a non internal pressure release section surface which is different from the internal pressure release section surface.

The plurality of battery cells 20, first end plate 31, and second end plate 32 are bound together by four metal binding bands 7. The binding bands 7 extend in the first direction and are coupled with the first and second end plates 31 and 32. One binding band 7 is provided for each of the second and fourth side surfaces 2b and 2d, and two binding bands 7 are provided for the third side surfaces 2c.

The battery monitoring element 4 monitors a state of each battery cell 20. The battery monitoring element 4 includes a resin base 41, a control board 42 arranged on one surface of the base 41, a breaker 43, and a connector 44. The control board 42 controls input current to the battery cell 20 as well as output current from the battery cell 20. The breaker 43 prevents inflow of high current from the battery cell 20. The connector 44 is electrically connected to, e.g., an external terminal of a vehicle.

The battery monitoring element 4 is disposed between a first end plate 31 and a second end plate 32. The battery monitoring element 4 is disposed on the second side surface 2b of the cell unit 2 and partially abuts against the second side surface 2b. Specifically, on the second side surface 2b of the cell unit 2, the spacer 26 is provided with convex portions 26a and concave portions 26b. The convex and concave portions 26a and 26b extend in the first direction (Z-direction). The convex and concave portions 26a and 26b are alternately arranged in a direction perpendicular to the first direction (Y-direction).

Figure 4:
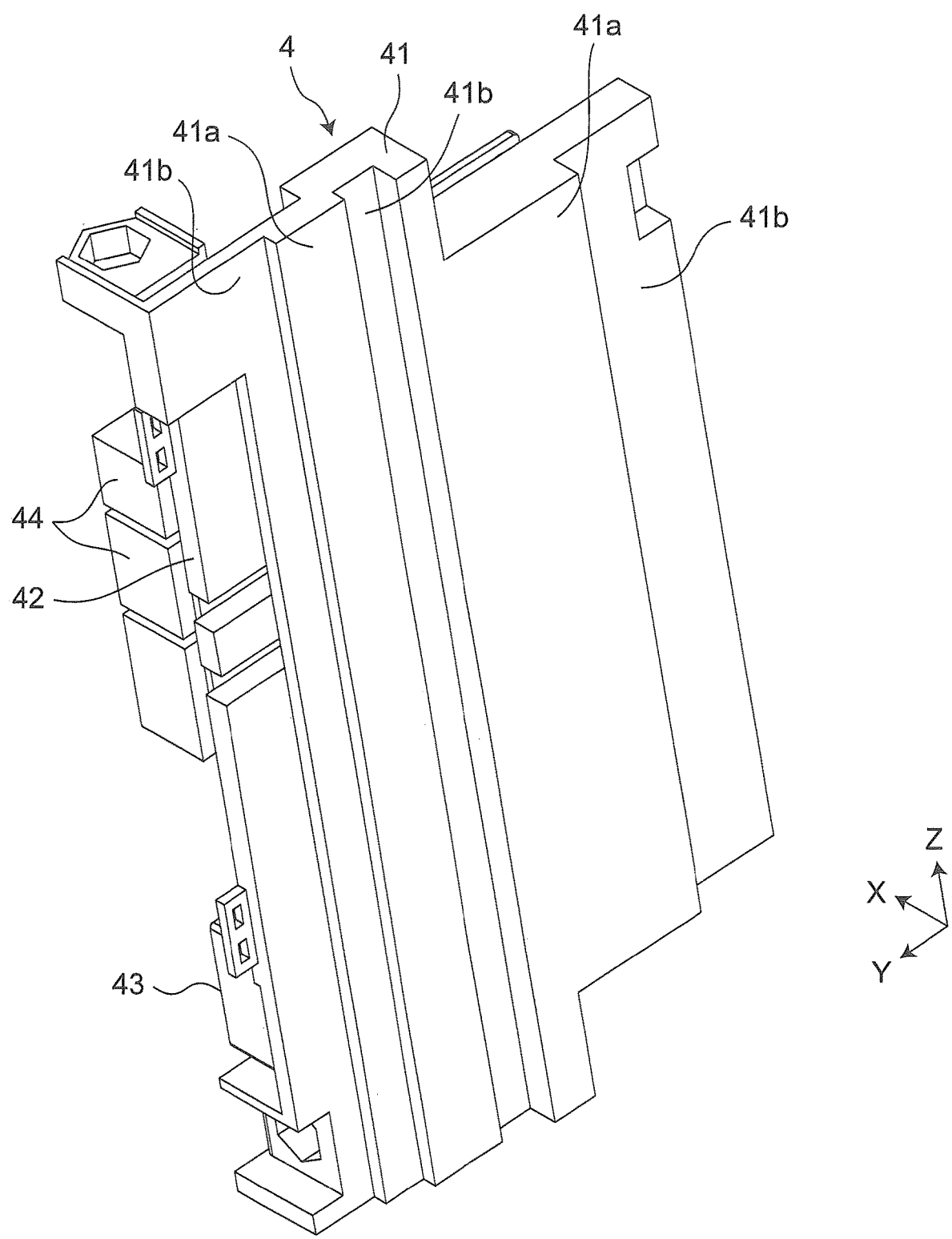
FIG. 4 is a perspective view of the battery monitoring element.

Further, as illustrated in FIG. 4, the battery monitoring element 4 is provided with convex portions 41a and concave portions 41b on the other surface of the base 41. The convex and concave portions 41a and 41b extend in the first direction (Z-direction). The convex and concave portions 41a and 41b are alternately arranged in a direction perpendicular to the first direction (Y-direction).

Figure 5:
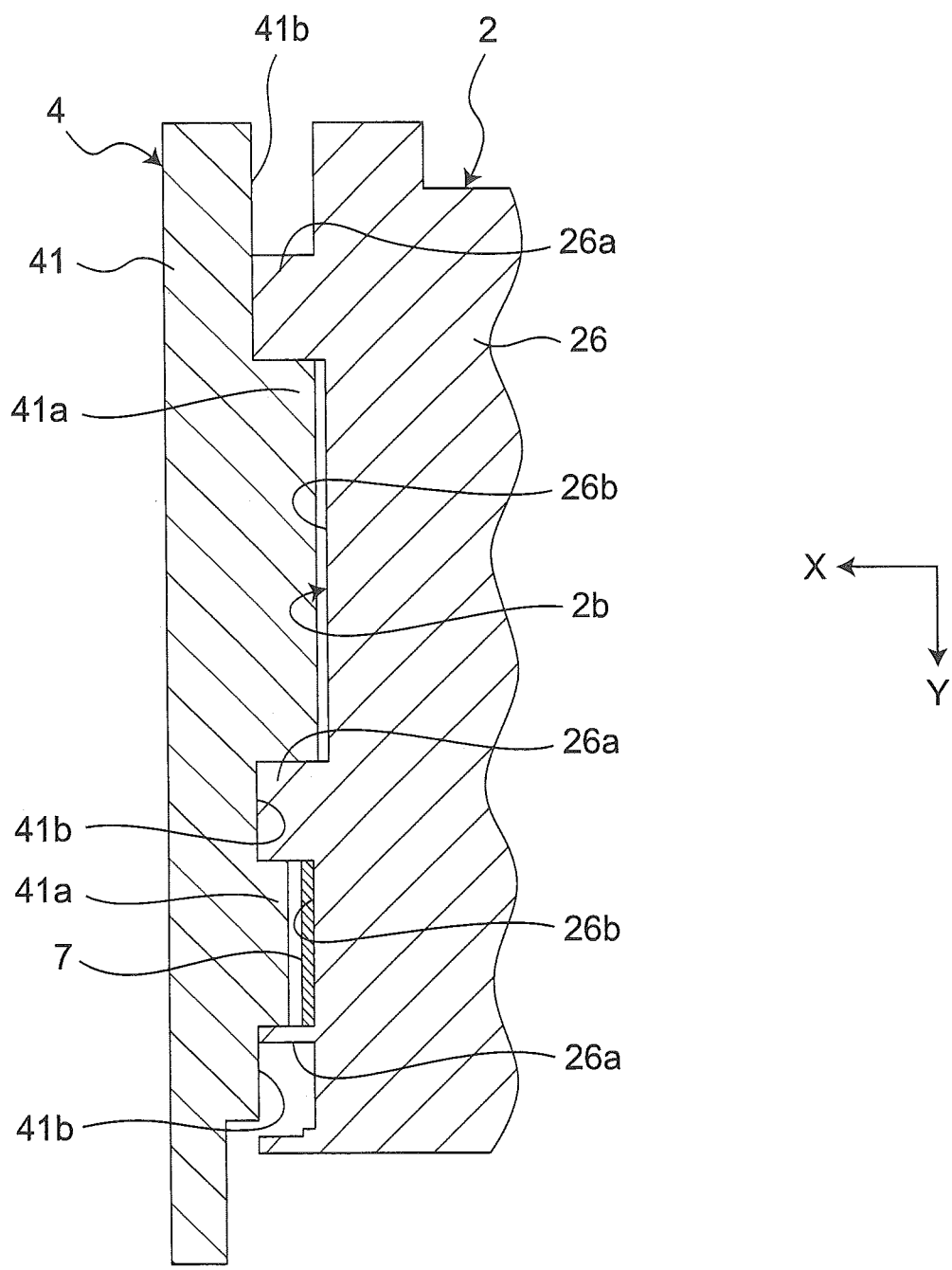
FIG. 5 is a sectional view of a contact status between the cell unit and the battery monitoring element.

As illustrated in FIG. 5, the convex portion 26a of the cell unit 2 and concave portion 41b of the battery monitoring element 4 are engaged with each other. The concave portion 26b of the cell unit 2 and convex portion 41a of the battery monitoring element 4 are engaged with each other. A top surface of the convex portion 26a of the cell unit 2 is brought into contact with a bottom surface of the concave portion 41b of the battery monitoring element 4.

The convex portions 26a of the cell unit 2 are formed with holes 26c (see FIG. 3) at the top surfaces. The bottom surfaces of the concave portions 41b of the battery monitoring element 4 may be formed with projections that are respectively engaged to the holes 26c. This configuration can achieve temporary fixation of the battery monitoring element 4 to the cell unit 2. Further, this configuration can prevent expansion of the plurality of battery cells 20 in the first direction. Thereafter, the base 41 of the battery monitoring element 4 are fixed to the cell unit 2 by screws. The holes 26c may be a through hole or a bottomed hole.

According to the battery module having the above configuration, the battery monitoring element 4 is disposed on the second side surface 2b of the cell unit 2 which is different from the first side surface 2a where the safety valves 23 are disposed. Therefore, the battery monitoring element 4 does not face the safety valves 23. As a result, since the safety valves 23 are not covered by the battery monitoring element 4, exhaust from the safety valves 23 is facilitated. Further, since the battery monitoring element 4 does not receive heat of exhaust from the safety valves 23, the battery monitoring element 4 is not heated.

The battery monitoring element 4 partially abuts against the second side surface 2b of the cell unit 2. This can eliminate a gap between the battery monitoring element 4 and second side surface 2b of the cell unit 2, thus achieving space saving.

Further, the terminals 21 and 22 of the respective battery cells 20 are disposed on the first side surface 2a. That is, the battery monitoring element 4 does not face the terminals 21 and 22. As a result, the bus bar 25 can be easily connected to the terminals 21 and 22, facilitating check of the terminals 21 and 22.

Further, since the battery monitoring element 4 is disposed between the first end plate 31 and second end plate 32, the battery monitoring element 4 can be protected from external impact, etc.

Further, the cell unit 2 and battery monitoring element 4 are accommodated in the case body 10 so that the end portion of the cell unit 2 in the first direction faces the opening of the case body 10. Thus, the battery monitoring element 4 is not disposed on the surface where the safety valves 23 are disposed. This allows the battery monitoring element 4 to abut against the cell unit 2, thus achieving space saving. On the other hand, in case that the battery monitoring element 4 is disposed over the safety valves 23, it is necessary to provide a gap between the safety valve 23 and battery monitoring element 4 for smooth exhaust from the safety valves 23. This disadvantageously increases a size of the module itself.

The battery monitoring element 4 may be positioned at the opening side relative to a height direction center of the case body 10 between its bottom surface and opening. Thus, when the case body 10 is installed with the bottom surface down and opening up, even if the safety valve 23 is opened to cause electrolyte in the battery cell 20 to leak inside the case body 10, the battery monitoring element 4 positioned at the upper part of the case body 10 does not soak in the electrolyte. Further, disposing the battery monitoring element 4 at the opening side of the case body 10 can reduce a distance between the battery monitoring element 4 and a communication connector disposed on the lid 11.

Second Embodiment

Figure 6:
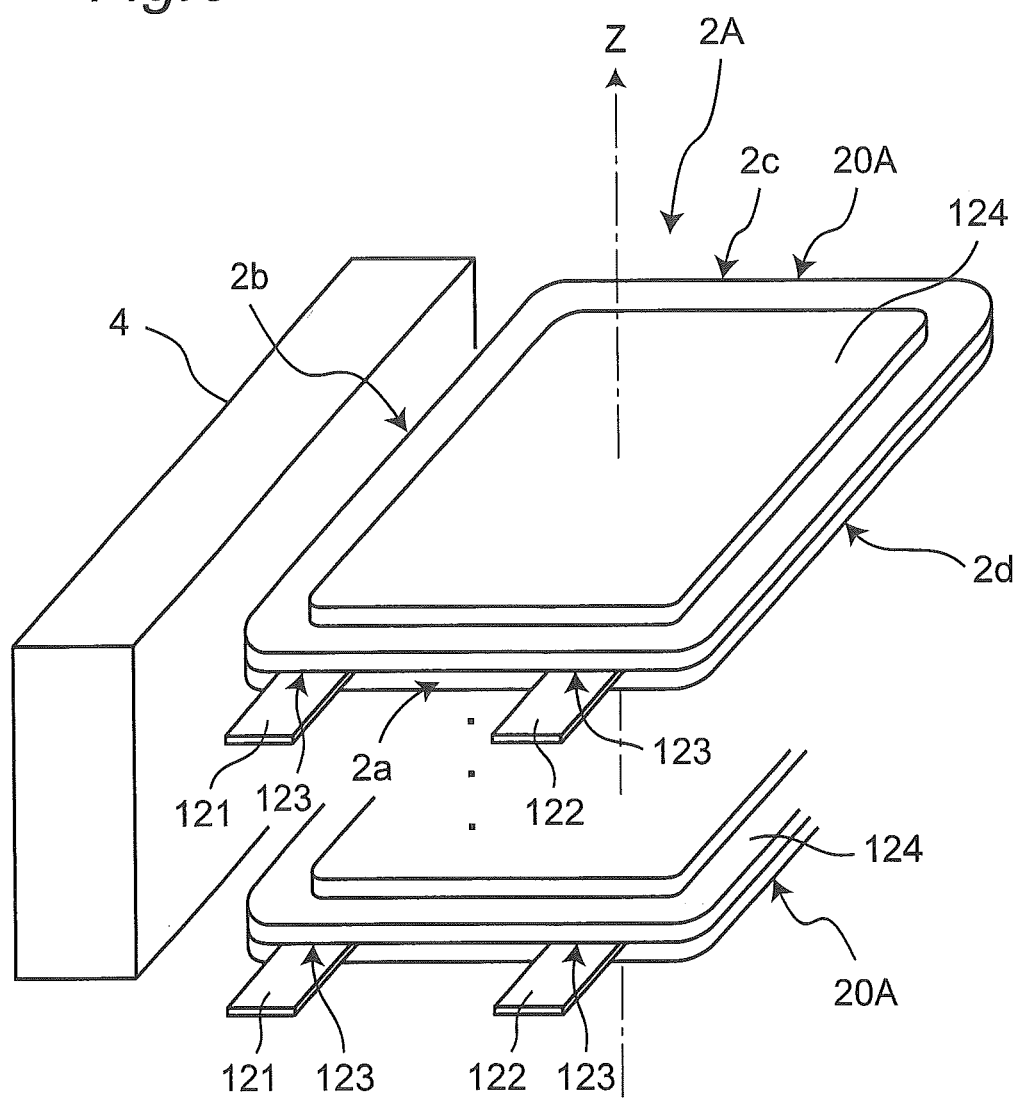
FIG. 6 is a schematic perspective view of a battery module according to a second embodiment of the present invention.

FIG. 6 is a perspective view illustrating a battery module according to a second embodiment of the present invention. The second embodiment differs from the first embodiment only in the configuration of the battery cells of the cell unit, and only the difference will be described.

As illustrated in FIG. 6, a battery cell 20A of a cell unit 2A is a laminate-type cell. That is, the battery cell 20A has a bag-like film body 124 and a power generating element accommodated in the film body 124. The film body 124 is formed by adhering two laminate films to each other by a heat seal. The power generating element has a positive electrode plate, a negative electrode plate, and separators interposed between the positive and negative electrode plates.

The cell unit 2A has four side surfaces around its periphery with respect to the first direction. The four side surfaces include a first side surface 2a, a second side surface 2b, a third side surface 2c, and a fourth side surface 2d, which are arranged sequentially in the peripheral direction with respect to the first direction. An internal pressure release section 123, a positive electrode terminal 121, and a negative electrode terminal 122 of the battery cell 20A are disposed on the first side surface 2a. In this embodiment, the internal pressure release sections 123 are respectively provided around the positive and negative electrode terminals 121 and 122. At each of the internal pressure release sections 123, adhesion between the two laminate films by the heat seal is relatively low. Therefore, when a pressure of gas generated in the film body 124 reaches above a predetermined value, the internal pressure release sections 123 release the gas out of the film body 124. The internal pressure release sections 123 may be provided at a portion other than the portions around the positive and negative electrode terminals 121 and 122.

Of the plurality of side surfaces of the cell unit 2A, the side surface on which the battery monitoring element 4 is disposed is the second side surface 2b which is different from the first surface 2a where the internal pressure release sections 123 are disposed. That is, the battery monitoring element 4 does not face the internal pressure release sections 123. As a result, the internal pressure release sections 123 are not covered by the battery monitoring element 4, thus facilitating exhaust from the internal pressure release sections 123. Further, the battery monitoring element 4 does not receive heat of exhaust from the internal pressure release sections 123 and thus is not heated.

The battery monitoring element 4 is disposed in the peripheral direction of the cell unit 2A with respect to the first direction, so that even if the battery cell 20A expands to be deformed in the first direction, the battery monitoring element 4 is not affected by the deformed battery cell 20A. Therefore, it is possible to prevent deformation of the battery monitoring element 4.

Third Embodiment

Figure 7:
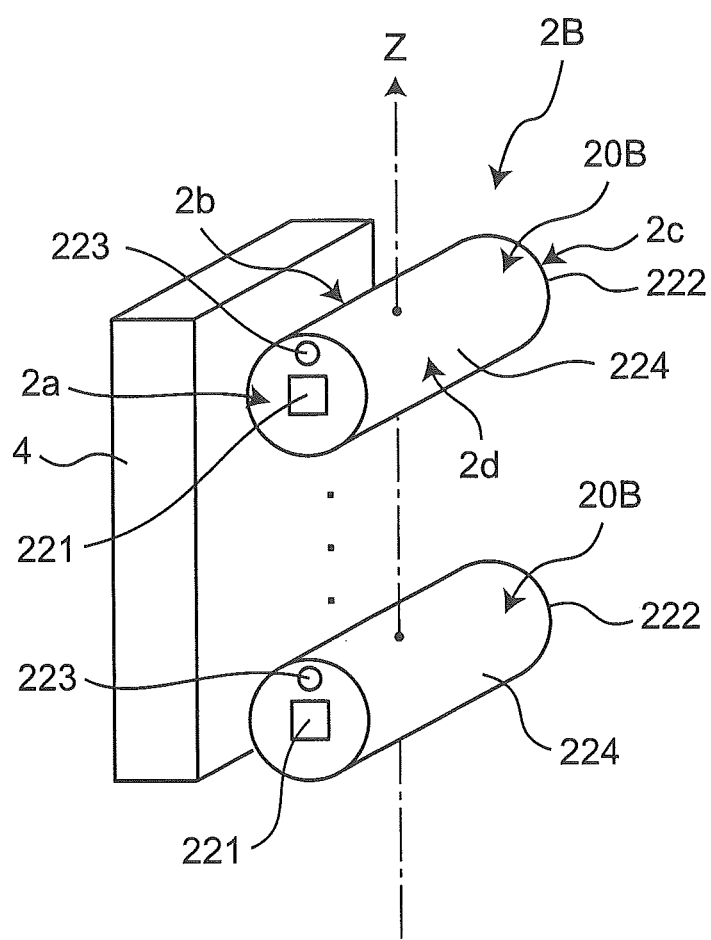
FIG. 7 is a schematic perspective view of a battery module according to a third embodiment of the present invention.

FIG. 7 is a perspective view illustrating a battery module according to a third embodiment of the present invention. The third embodiment differs from the first embodiment only in the configuration of the battery cells of the cell unit, and only the difference will be described.

As illustrated in FIG. 7, a battery cell 20B of a cell unit 2B has a cylindrical container 224 and a power generating element contained in the container 224. The power generating element has a positive electrode plate, a negative electrode plate, and separators interposed between the positive and negative electrode plates.

A plurality of the battery cells 20B are arranged so that peripheral surfaces of the container 224 of the respective battery cells 20B overlap one another when viewed in the first direction. The cell unit 2B has a first side surface 2a, a second side surface 2b, a third side surface 2c, and a fourth side surface 2d, which are arranged sequentially in a peripheral direction with respect to the first direction.

The first side surface 2a corresponds to one end surface of the cylindrical container 224 in an axial direction thereof, the third side surface 2c corresponds to the other end surface of the cylindrical container 224 in the axial direction thereof, the second side surface 2b and fourth side surface 2d correspond to the peripheral surface of the cylindrical container 224. A safety valve 223 and a positive electrode terminal 221 of each battery cell 20B are disposed on the first side surface 2a. A negative electrode terminal 222 is disposed on the third side surface 2c. When a pressure of gas generated in the container 224 reaches above a predetermined value, the safety valve 223 releases the gas out of the container 224.

Of the plurality of side surfaces of the cell unit 2B, the side surface on which the battery monitoring element 4 is disposed is the second side surface 2b which is different from the first surface 2a where the internal pressure release sections 223 are disposed. That is, the battery monitoring element 4 does not face the safety valves 223. As a result, the safety valves 223 are not covered by the battery monitoring element 4, thus facilitating exhaust from the safety valves 223. Further, the battery monitoring element 4 does not receive heat of exhaust from the safety valves 223 and thus is not heated.

The present invention is not limited to the above embodiments. For example, the number of the battery cells may be increased or decreased as desired. The positions of the positive and negative electrode terminals may be reversed. At least one of the first and second end plates may be omitted.

Although the battery monitoring element is made to partially abut against the second side surface of the cell unit in the above embodiments, the battery monitoring element may be made to fully abut against the second side surface or may be made to abut against at least a part of the second side surface.

Although the ter urinals of each battery cell are disposed on the first side surface in the above embodiments, the terminals may be disposed on the third and fourth side surfaces.

Although the battery monitoring element is made to partially abut against the spacers of the cell unit in the above embodiment; the battery monitoring element may be made to abut against the bus bars of the cell unit. That is, the cell unit may have a member directly contacting the battery cell, and the battery monitoring element may be made to abut against the member.

Although the battery monitoring element is made to partially abut against the spacers of the cell unit in the above embodiment, the battery monitoring element may be made to abut against the battery cells of the cell unit when the cell unit does not have the spaces.

The battery monitoring element is disposed on one side surface in the above embodiments; however, for example, the control board of the battery monitoring element may be disposed on the second side surface, whereas connectors of the battery monitoring element may be disposed on the third side surface. That is, the battery monitoring element may be disposed across a plurality of side surfaces other than the first side surface.

Although the internal pressure release section is provided on the same surface as that where the terminals of each battery cell is provided in the above embodiments, the internal pressure release section may be provided on a surface different from that where the terminals of each battery cell is provided.

Although the internal pressure release section is provided on one surface in the above embodiments, the internal pressure release section may be provided on a plurality of surfaces.

What is claimed is:

1. A battery module, comprising:
a cell unit including a plurality of battery cells arranged in a first direction;
a battery monitoring element attached to the cell unit,
wherein each of the battery cells includes an internal pressure release section configured to release a pressure in said each of the battery cells,
wherein the cell unit includes, in a peripheral direction thereof with respect to the first direction, a plurality of side surfaces including at least one internal pressure release section surface which is a surface where the internal pressure release section of said each of the battery cells is disposed,
wherein the battery monitoring element is disposed on a non-internal pressure release section surface included in the plurality of side surfaces of the cell unit, the non-internal pressure release section surface facing a direction different from the internal pressure release section surface, and
wherein a control board and a base, on one surface of which the control board is arranged, of the battery monitoring element are arranged so as to be elongated along the first direction, the base including another surface, located opposite to the one surface of the base, and being in direct contact with and engaged with the non-internal pressure release section surface of the cell unit;
a case body with an opening; and
a lid attached to the case body so as to close the opening of the case body,
wherein the cell unit and the battery monitoring element are accommodated in the case body so that an end portion of the cell unit in the first direction faces the opening of the case body, and
wherein the lid includes an external terminal.

2. The battery module according to claim 1, wherein the battery monitoring element abuts against at least a part of the non internal pressure release section surface of the cell unit.

3. The battery module according to claim 1, wherein the cell unit includes a spacer interposed between adjacent battery cells,
wherein the spacer is formed with a hole, and
wherein the battery monitoring element includes a projection engaged to the hole.

4. The battery module according to claims 1, wherein terminals of said each of the battery cells are disposed on the internal pressure release section surface.

5. The battery module according to claim .1, wherein the cell unit includes two end plates respectively disposed at both sides of the plurality of battery cells in the first direction, and
wherein the battery monitoring element is disposed between the two end plates.

6. The battery module according to claim 1, wherein the battery monitoring element is positioned at an opening side relative to a height direction center of the case body between a bottom surface of the case body and the opening.

7. The battery module according to claim 1, wherein said each of the battery cells includes a square container and a power generating element contained in the container.

8. The battery module according to claim 1, wherein said each of the battery cells includes a bag-like film body and a power generating element contained in the film body.

9. The battery module according to claim 1, wherein said each of the battery cells includes a cylindrical container and a power generating element contained in the container.

10. The battery module according to claim 2, wherein the cell unit includes a spacer interposed between adjacent battery cells,
wherein the spacer is formed with a hole, and
wherein the battery monitoring element includes a projection engaged to the hole.

11. The battery module according to claim 1, wherein, in the first direction, said each of the battery cells is located adjacent to another one of the battery cells.

12. The battery module according to claim 1, wherein, in the first direction, the battery monitoring element extends to cover said each of the battery cells.

13. The battery module according to claim 1, wherein, in the first direction, the non-internal pressure release section surface extends to cover said each of the battery cells.

14. The battery module according to claim 1, wherein said each of the battery cells is elongated in a second direction orthogonal to the first direction.

15. The battery module according to claim 5, wherein each of the two end plates extends in a second direction orthogonal to the first direction, and
wherein the battery monitoring clement extends from one of the two end plates to another one of the two end plates.

* * * * *